(12) United States Patent
Wohlfarth et al.

(10) Patent No.: US 12,409,816 B2
(45) Date of Patent: Sep. 9, 2025

(54) VEHICLE SYSTEM FOR CARRYING OUT BRAKING

(71) Applicant: ZF Friedrichshafen AG, Friedrichshafen (DE)

(72) Inventors: Andreas Wohlfarth, Owingen (DE); Martin Pollak, Lindau (DE); Eva-Maria Baur, Friedrichshafen (DE); Frank Salamon, Fronreute (DE); Roman Krzemien, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 99 days.

(21) Appl. No.: 18/566,544

(22) PCT Filed: May 13, 2022

(86) PCT No.: PCT/EP2022/063031
§ 371 (c)(1),
(2) Date: Dec. 1, 2023

(87) PCT Pub. No.: WO2022/253554
PCT Pub. Date: Dec. 8, 2022

(65) Prior Publication Data
US 2024/0359668 A1  Oct. 31, 2024

(30) Foreign Application Priority Data
Jun. 2, 2021 (DE) .......................... 102021205633.4

(51) Int. Cl.
*B60T 7/22* (2006.01)
*B60T 17/22* (2006.01)
(52) U.S. Cl.
CPC .............. *B60T 7/22* (2013.01); *B60T 17/228* (2013.01); *B60T 2201/022* (2013.01); *B60T 2210/32* (2013.01)

(58) Field of Classification Search
CPC . B60T 7/22; B60T 7/12; B60T 17/228; B60T 2201/022; B60T 2210/32
(Continued)

(56) References Cited

U.S. PATENT DOCUMENTS

2006/0232124 A1  10/2006  Friedrich et al.
2015/0353062 A1  12/2015  Breuer et al.
(Continued)

FOREIGN PATENT DOCUMENTS

DE  10 2009 002 815 A1  11/2010
DE  10 2014 201 158 A1   7/2015
(Continued)

OTHER PUBLICATIONS

International Search Report and Writeen Opinion received for Application No. PCT/EP2022/063031 mailed Oct. 7, 2022 (12 pages).
(Continued)

*Primary Examiner* — Hai H Huynh
(74) *Attorney, Agent, or Firm* — Crowell & Moring LLP

(57) ABSTRACT

A vehicle system for braking a vehicle includes a first sensor system for recording a first image of a vehicle's environment, an evaluation unit for evaluating the first image, a second sensor system for recording a second image of the vehicle's environment, and a second evaluation unit. The first evaluation unit identifies a critical braking situation in the first image and the second evaluation unit identifies a critical braking situation in the second image. The vehicle system initiates braking with a first braking force when a critical braking situation is identified in the first image, initiates braking with a second braking force when a critical braking situation is identified in the second image, and initiates braking with a third braking force when a critical braking situation is identified in both the first and second
(Continued)

Figure 1:
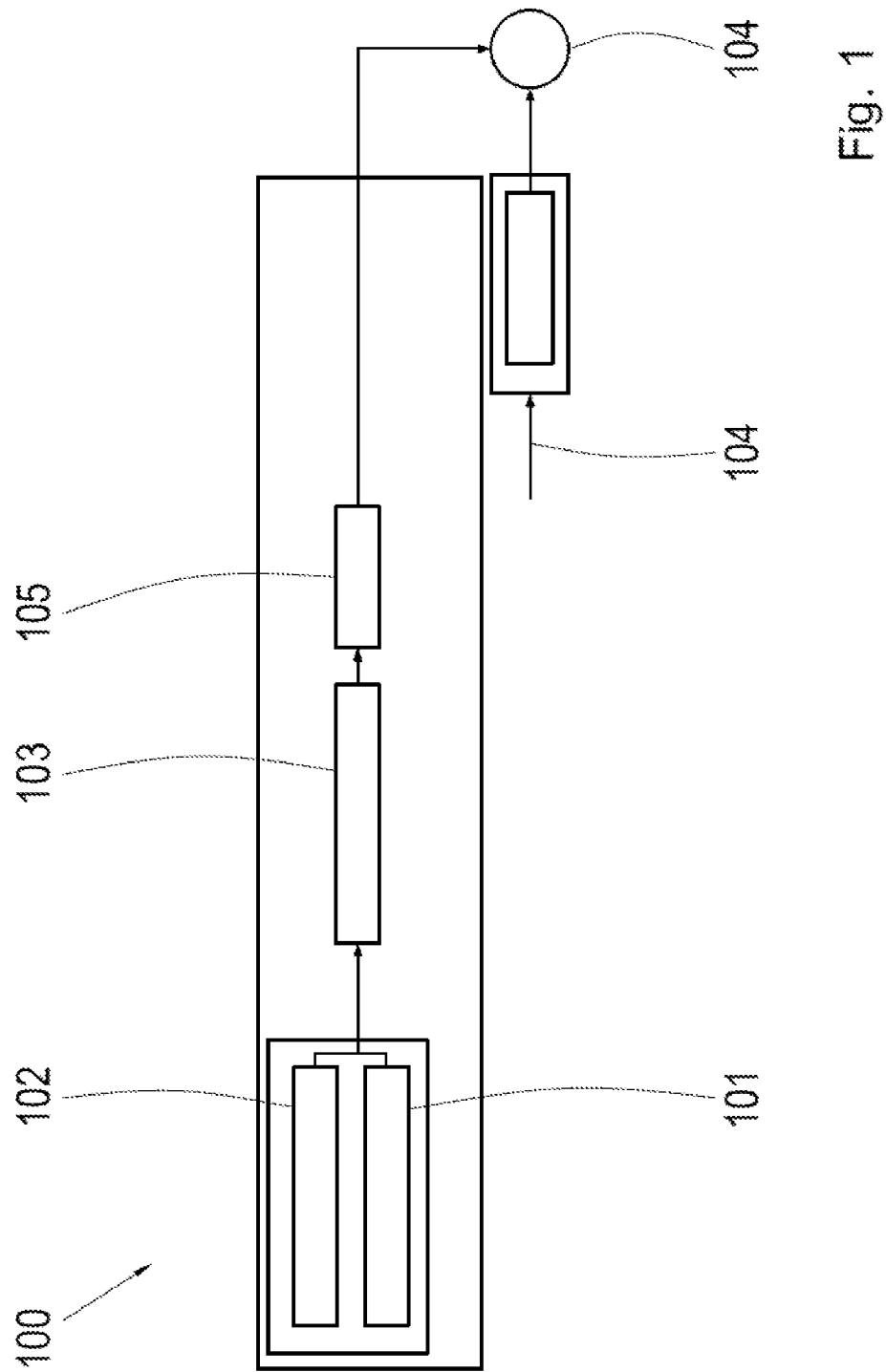

images, wherein the third braking force is stronger than the first and second braking forces.

20 Claims, 4 Drawing Sheets

(58) Field of Classification Search
USPC .......................................................... 701/70
See application file for complete search history.

(56) References Cited

U.S. PATENT DOCUMENTS

| | | |
|---|---|---|
| 2018/0001890 A1 | 1/2018 | Ratcliffe |
| 2019/0196481 A1 | 6/2019 | Tay et al. |
| 2021/0094577 A1 | 4/2021 | Shalev-Shwartz et al. |

FOREIGN PATENT DOCUMENTS

| | | |
|---|---|---|
| DE | 10 2016 012 345 A1 | 5/2017 |
| DE | 10 2017 115 473 A1 | 1/2019 |
| DE | 2019 210 339 A1 | 1/2021 |
| EP | 2 948 349 B1 | 7/2019 |

OTHER PUBLICATIONS

Office Action dated Jan. 25, 2022 for German Patent Application No. 10 2021 205 633.4 (8 pp.).

VEHICLE SYSTEM FOR CARRYING OUT BRAKING

CROSS-REFERENCE TO RELATED APPLICATIONS

This application is a U.S. national stage application under 35 U.S.C. § 371 of PCT Application No. PCT/EP2022/063031, filed on May 13, 2022, and published as WO 2022/253554 A1 on Dec. 8, 2022, which claims priority from German Application No. DE 10 2021 205 633.4, filed on Jun. 2, 2021, the entirety of which are each hereby fully incorporated by reference herein.

The invention relates to a vehicle braking system containing a first sensor system for creating a first image of a vehicle's environment, and a first evaluation system for evaluating the first image of the environment with regard to critical braking situations, and it contains a second sensor system for creating a second image of the vehicle's environment, and a second evaluation unit, with the first image and second image overlapping to a large extent, and the first evaluation unit configured to detect a critical braking situation in the first image and the second evaluation unit configured to detect a critical braking situation in the second image. The invention also relates to a vehicle and a train.

Particularly with highly automated vehicles, it is difficult to determine whether and to what extent a given situation or an aspect thereof has been correctly identified. One of the problems in doing so is that the evaluation of the sensors frequently varies, or not all of the available information is interpreted correctly.

By way of example, objects may be identified that are not present. This inaccurate object identification could lead to an emergency braking, potentially resulting in serious injury to the vehicle occupants or damage to other vehicles.

For this reason, evaluated camera images are subsequently checked with other evaluators in the prior art before braking is initiated in, for example, an autonomous vehicle.

DE 10 2016 012 345 A1 discloses a method for identifying objects in a vehicle's environment using an object identification system comprising at least one camera, an image processing module, and a lidar sensor, in which the identification system records the data from the camera in a first step, which is then evaluated in the image processing module in order to formulate hypotheses regarding the object, after which these hypotheses are verified using the lidar system in a second step, and the hypotheses are then accepted or rejected in a third step.

DE 10 2014 201 158 A1 discloses a method for verifying an object identified with a driver-assistance system in which the method comprises the following steps: data acquisition regarding the object in question, inputting a masking signal indicating the presence of another object within the field of vision of the object identification system that conceals the first object, and determining the plausibility of the data regarding the object in question on the basis of the masking signal.

EP 2948349 B1 discloses a method for determining a triggering criteria for outputting braking signals in a vehicle that comprises at least the following steps: detecting at least one object in a vehicle's environment, determining whether the vehicle is on a collision course with the object, checking avoidance criteria if the collision course is verified, which is satisfied if it is possible for the vehicle to avoid the object, then checking braking criteria if the avoidance criteria is satisfied, wherein the triggering criteria for outputting braking signals is satisfied if both the avoidance criteria and braking criteria are satisfied.

It is therefore the object of the invention to create a system for a vehicle with which unnecessary braking, in particular unnecessary emergency braking, is prevented. The object of the invention also relates to a vehicle and a train.

These problems are solved with a system for a vehicle containing the features of claim 1. They are also solved by a vehicle that has the features of claim 13 and a train with the features of claim 14.

Advantageous developments, which can be implemented individually or in combinations with one another, are described in the dependent claims and the description.

The object is achieved with a system for a vehicle with which a vehicle can be braked, which contains a first sensor system for obtaining a first image of the vehicle's environment and a first evaluation unit for evaluating the first image with regard to a critical braking situation, and containing a second sensor system, which is independent of the first sensor system, for obtaining a second image of the vehicle's environment, and a second evaluation unit, with the first image and second image overlapping to a large extent, in which the first evaluation unit is configured to identify a critical braking situation in the first image and the second evaluation unit is configured to identify a critical braking situation in the second image, and the system is configured to initiate braking with a first braking force when a critical braking situation has been identified in the first image and to initiate braking with a second braking force when a critical braking situation has been identified in the second image, and to initiate braking with a third braking force if a critical braking situation has been identified in the first image and in the second image, with this third braking force being greater than the second and first braking forces.

The first and second images preferably show the same view of the environment, i.e. the first sensor system and the second sensor system record the same, or substantially the same, vehicle environment.

A sensor system can contain a single sensor or an array of sensors.

A critical braking situation is when a distance to an object in front of the vehicle is shorter than a predetermined braking distance. This can also be the case if a leading vehicle brakes suddenly and quickly, or an object such as a pedestrian suddenly crosses in front of the vehicle. Critical braking situations can also occur that are not the fault of the vehicle's behavior, e.g. when another vehicle does not have right-of-way.

In the prior art, it is only checked whether and to what extent objects, i.e. braking situations, are reliably identified. Braking only takes place in the prior art if the object or braking situation has been reliably identified and verified.

The vehicle system according to the invention results in different degrees of braking. The invention results in a resolution of the safety conflict in tiers: each identification leads to a reaction, or braking, specific thereto. Braking with a first or second braking force is gentler. This preferably does not endanger the passengers in the vehicle or other vehicles that are behind it. If a critical braking situation has been identified in both images by the independent sensor systems, a stronger, preferably maximum reaction is triggered, resulting in stronger braking force.

The vehicle system according to the invention prevents excessive deceleration, which could endanger passengers and other vehicles, while still preventing collisions that would otherwise occur if the brakes were not applied, e.g.

with objects, vehicles, or pedestrians in front of the vehicle, because any identification of a critical braking situation in at least one sensor system triggers a reaction.

The vehicle system according to the invention ensures reliable braking in a critical braking situation, even when there are only two sensor systems.

The vehicle system according to the invention satisfies the functional safety stipulations of SOTIF (Safety of the Intended Functionality). The vehicle system according to the invention safeguards against malfunctions.

In another embodiment, the first evaluation unit and second evaluation unit process data in parallel such that the first evaluation unit identifies an existing braking situation in the first image and the second evaluation unit identifies the same braking situation in the second image at the same time.

This significantly shortens the time needed for a statistical validation, because it results in a distribution of the goals that are to be verified. Parallel processing also enables a very quick reaction when a critical braking situation has been identified. Even if one of the sensor systems has not yet identified a critical braking situation, braking can still be initiated by the vehicle system if the other sensor system has identified a critical braking situation. If the other sensor system subsequently identifies a critical braking situation, the brakes can then be applied fully.

Parallel processing also makes it possible to process data and react in realtime.

In another embodiment, the first braking force is equal to the second braking force. The results obtained with the different sensor systems can therefore be of equal value.

In another embodiment, the first sensor system and second sensor system use different types of sensors. This further increases the reliability of the identification of a critical braking situation. By way of example, one of the sensor systems can be more suited to identifying critical braking situations at close distances, while the other is more effective at night or in rain or snowstorms.

In another embodiment, the vehicle system triggers hazard braking with the third braking force. This hazard braking is also referred to a full braking. The aim with hazard braking is to stop all four wheels as effectively and quickly as possible, thus bringing the vehicle to a standstill as quickly as possible. This significantly lowers the probability of a collision with an object or other vehicles that are in front of the vehicle.

In another embodiment, the vehicle system can be configured to issue a warning when hazard braking has been initiated. This can be an acoustic and/or visual warning for the vehicle occupants, or it can be a visual and acoustic warning to others in the vehicle's environment.

The passengers in a bus, train, or vehicle can be warned in this manner, such that they can prepare for sudden braking.

The hazard braking can be controlled automatically by a brake assist system in order to be able stop the vehicle with maximum braking force.

In another embodiment, the vehicle system is designed such that the second or first braking force results in application of the emergency braking system. This emergency braking system results in a quick and powerful braking that does not harm vehicle occupants, i.e. a softer braking that does not result in the vehicle coming to an abrupt standstill, as would be the case with the hazard braking.

In another embodiment, the first sensor system can be a radar sensor system, and the second sensor system can be a lidar sensor system. These sensor systems are reliable, even in adverse conditions. Moreover, objects can be quickly identified in radar and lidar data.

Other embodiments can also make use of different sensor technologies, e.g. cameras, ultrasonic sensors, or other acoustic technologies such as echolocation. These different sensor technologies can be combined in a number of ways.

There is a diagnostic system in another embodiment, with which the functioning of the first and second sensor system is checked, and a diagnosis is obtained on the basis thereof, in which case the vehicle system is designed to take the diagnosis into account when braking if a braking situation has been identified by both sensor systems.

The identification of the braking situation by the sensors systems can be tiered. By way of example, if no collision or danger has been identified, braking is not initiated in a first tier. If a collision can be avoided, braking is initiated in a second tier with a second braking force. If a collision cannot be avoided, braking is initiated in a third tier with a third braking force.

This diagnostic system allows for an error and/or malfunction, and/or failure of one of the two sensor systems to be taken into account.

This makes it possible to take errors in the evaluation, or an erroneous or lack of identification, into account. This increases the operational safety, in particular with autonomous vehicles.

In another embodiment, if an error and/or malfunctioning of both sensor systems has been detected by the diagnostic system, and a critical braking situation has been identified by at least one of the sensor systems, the vehicle system is configured to initiate braking with the third braking force. This assumes that the malfunctioning sensor system that failed to identify a braking situation was unable to do so. This increases the safety for the vehicle occupants as well as for other road users.

In another embodiment, if an error and/or malfunctioning of one of the sensor systems has been detected, and a critical braking situation has been identified by both sensor systems, the vehicle system is configured to initiate braking with the third braking force.

If an error and/or malfunctioning of one of the two sensor systems has been detected and no critical braking situation has been identified by either sensor system, the vehicle system is configured to initiate braking with the first or second braking force. This assumes that the malfunctioning sensor system would have identified a critical braking situation if it had been functioning properly. This increases the safety for the vehicle occupants as well as for other road users.

Furthermore, if an error and/or malfunctioning of one of the sensor systems has been detected and a critical braking situation has been identified by the sensor system that is still functioning, the vehicle system is configured to initiate braking with the third braking force. This assumes that the malfunctioning sensor system would have also identified the critical braking situation if it were functioning correctly. This increases the safety for the vehicle occupants as well as for other road users.

The object is also achieved with a vehicle containing the vehicle system described above. The vehicle can be an autonomous vehicle, e.g. a bus, containing numerous passengers. Unnecessary emergency braking can be prevented therewith, while still adhering to the maximum safety criteria for other road users.

The object is also achieved with a train containing the vehicle system described above. The vehicle system is particularly suitable for trains or other rail vehicles. These also transport numerous passengers.

Figure 2:
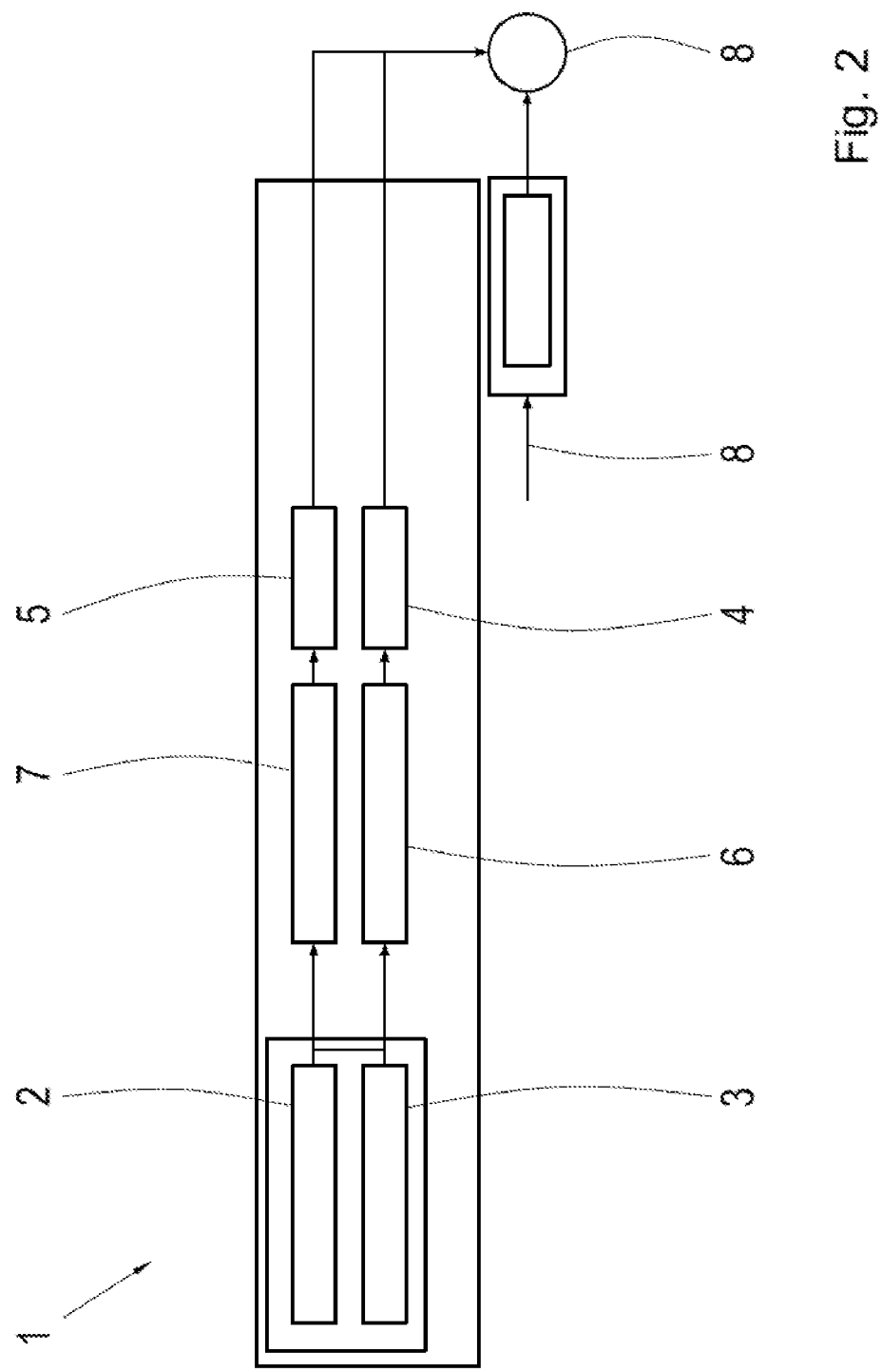
Figure 3:
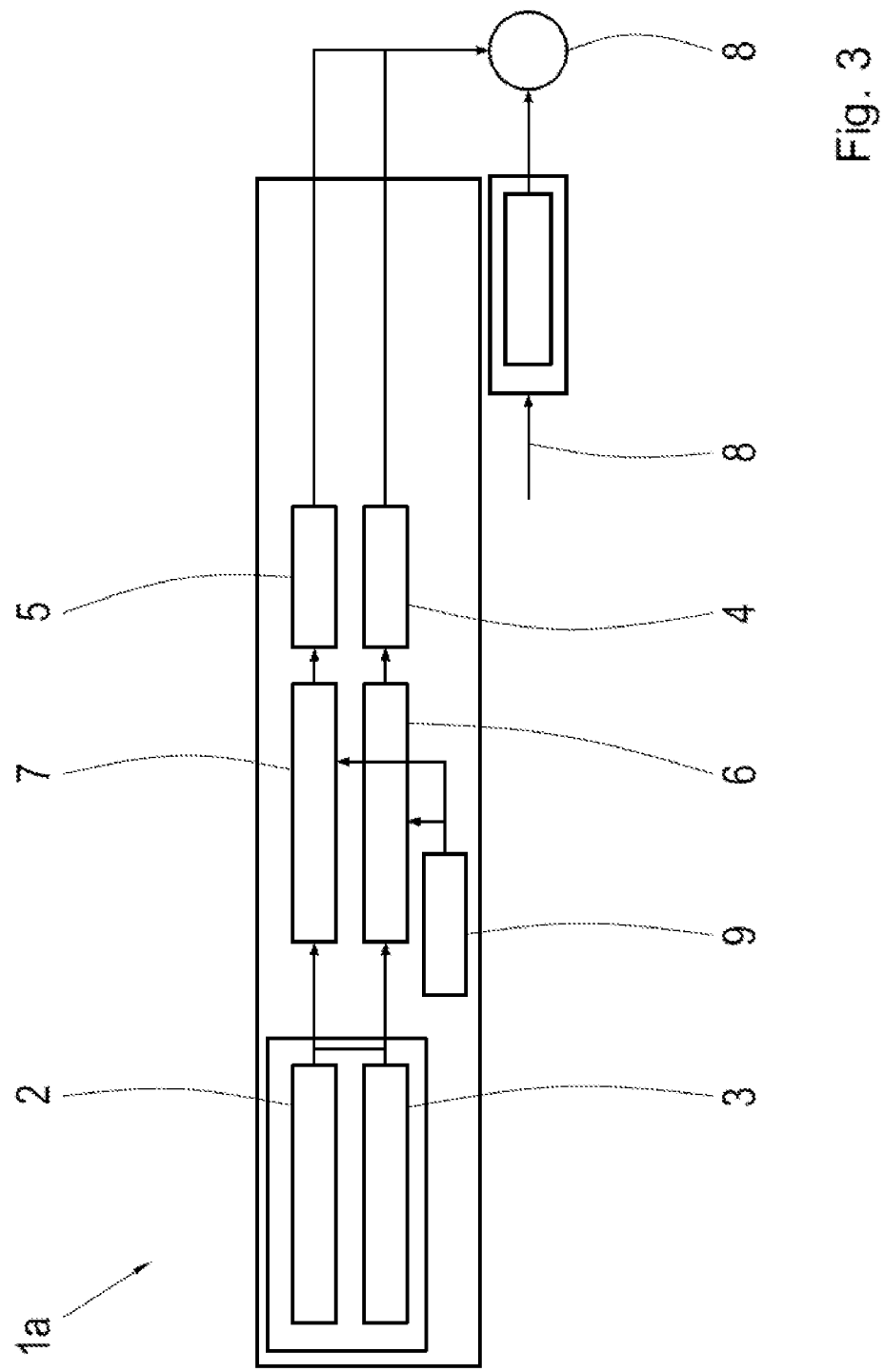
Figure 4:
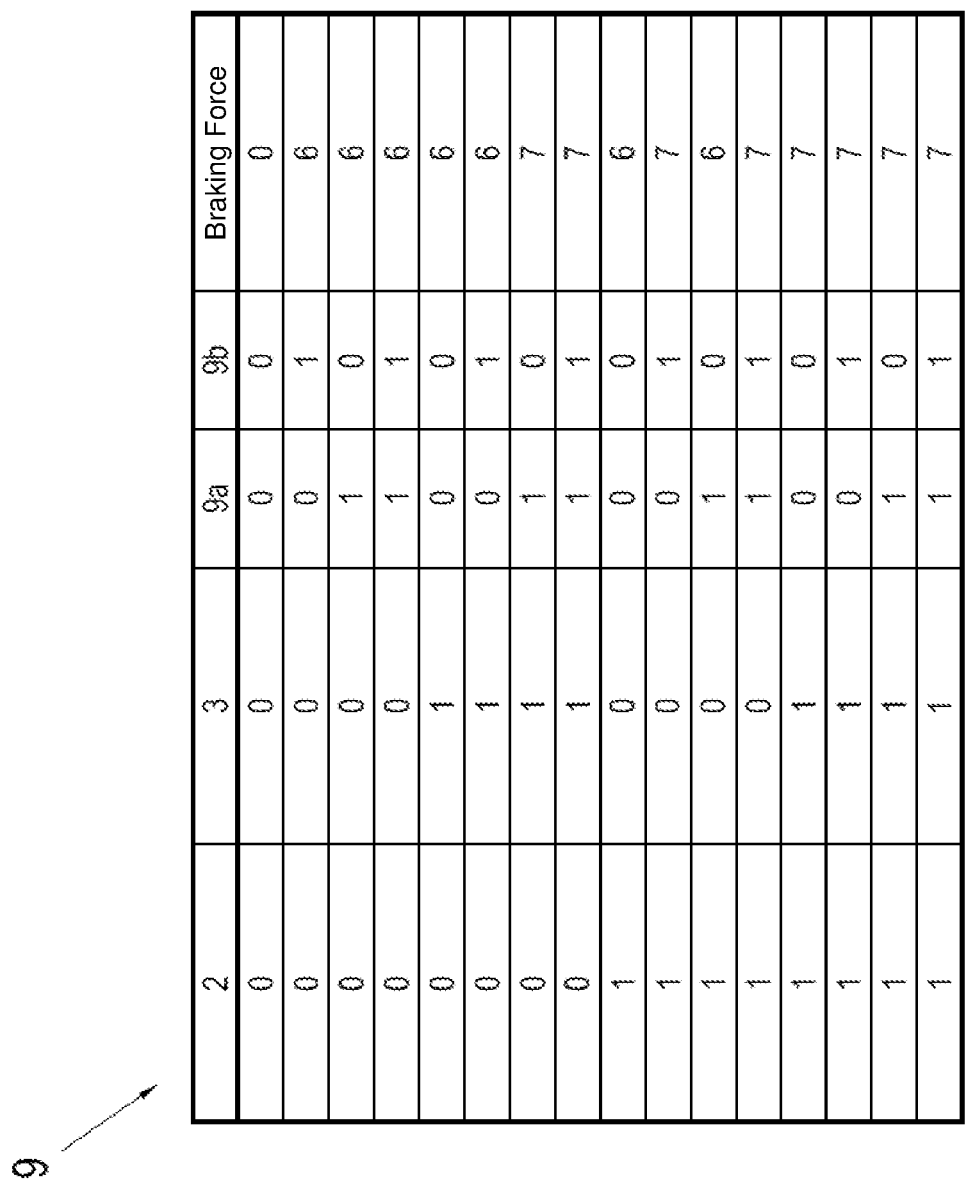

Other properties and advantages of the present invention can be derived from the following description in reference to the drawings. Therein, schematically:

FIG. 1: shows a vehicle system according to the prior art;

FIG. 2: shows a first embodiment of the vehicle system according to the invention;

FIG. 3: shows another embodiment of the vehicle system according to the invention; and FIG. 4: shows a table listing possible diagnoses.

FIG. 1 shows a vehicle system 100 in a vehicle according to the prior art. This contains a first sensor 101 and a second sensor 102. The first sensor 101 records an image of the environment. The second sensor 102 also records an image of the environment. A critical braking situation is subsequently identified by the first sensor 101. This is checked by the second sensor 102. If the check is verified, full braking or hazard braking 103 is initiated and carried out 105, thus overriding the normal autonomous driving mode 104.

A critical braking situation exists when the distance to an object in front of the vehicle is shorter than a predefined distance. This can also be the case if a leading vehicle brakes suddenly and quickly, or an object such as a pedestrian suddenly crosses in front of the vehicle. Critical braking situations can also occur that are not the fault of the vehicle's behavior, e.g. when another vehicle does not have right-of-way.

FIG. 2 shows a first embodiment of the vehicle system 1 according to the invention. This has a first sensor system 2, comprising one or more lidar sensors. The vehicle system 1 also contains a second sensor system 3, which is independent of the first sensor system 2.

The second sensor system 3 comprises one or more radar sensors. It is advantageous for a first sensor system 2 to use different sensor technology than the second sensor system 3, because this results in a reliable identification of an object in front of the vehicle. They can also use the same sensor technology. It is particularly advantageous to use lidar and radar sensors because these can reliably and quickly identify objects, and therefore braking situations.

The first sensor system 2 records a first image of the vehicle's environment, and the second sensor system 3 records a second image of the vehicle's environment. The first and second images preferably show the same area, or largely overlap. There is also a first evaluation unit for identifying a critical braking situation in the first image. The first evaluation unit can be incorporated as software in the first sensor system itself.

There is also a second evaluation unit for identifying a critical braking situation in the second image. The second evaluation unit can also be incorporated as software in the second sensor system.

The vehicle system 1 is also configured to initiate braking with a first braking force 6 when a critical braking situation is identified in the first image, and to initiate braking with a second braking force 6 when a critical braking situation is identified in the second image.

The first braking force 6 and second braking force 6 are preferably identical.

The first braking force 6 and second braking force 6 trigger an emergency braking 4, which leads to a quick and powerful braking. This type of braking results in a quick braking that will not harm any vehicle occupants, i.e. a gentler braking that does not lead to a standstill of the vehicle as quickly as possible, as is the case with hazard braking 5.

The vehicle system 1 is also configured to initiate braking with a third braking force 7 when a critical braking situation has been identified in both the first image and the second image, in which case the third braking force 7 is stronger than the second braking force 6 and first braking force 6.

The first image and second image are evaluated in parallel. As a result, braking with at least the first or second braking force 6 can be initiated separately if a braking situation has been identified.

This results in a realtime reaction. Furthermore, the parallel evaluation enables a quicker reaction.

The third braking force 7 is preferably for hazard braking 5 (full braking). This brings the vehicle to a standstill as quickly as possible (maximum braking reaction). This significantly lowers the probability of a collision with an object or other vehicles. Nevertheless, this hazard braking 5 may be harmful to the vehicle occupants.

The vehicle system 1 can also be configured to issue an acoustic or visual warning to both the vehicle occupants and any other vehicles when such a hazard braking 5 is initiated. This allows the vehicle occupants to prepare for impact and the vehicles behind it to also initiate braking to avoid a rear-end collision.

A conflict between safety goals, specifically hazard braking 5 and no braking at all, is resolved with the vehicle system 1 according to the invention by a tiered reaction. This prevents excessive deceleration, which is dangerous for passengers and other vehicles. At the same time, a complete lack of braking, which could lead to a collision, is also prevented.

The conflict in safety goals is resolved with the vehicle system 1 according to the invention by a tiered braking reaction. Each identification results in a (different) braking reaction.

Even a first tier, specifically the identification of a critical braking situation in just one image of the environment, resulting in a system reaction, specifically a reduced, quick braking that nevertheless does not pose any danger for passengers and other vehicles, can prevent or reduce a collision.

The second tier, specifically identification of a critical braking situation in both images by both sensor systems 2, 3, or their evaluation units, results in a maximum system reaction, specifically a hazard braking 5 or a very strong braking.

The statistical validation is obtained extremely quickly as a result of the parallel processing, because this allows for a distribution of the goals that are to be verified.

In the event of a hazard braking 5 or emergency braking 4, the normal, e.g. autonomous, operating mode 8 is overridden. FIG. 3 shows another embodiment of the vehicle system 1a according to the invention. Like the first vehicle system 1, this also contains the first sensor system 2 and the independent second sensor system 3.

The first sensor system 2 records the vehicle environment in a first image, and the second sensor system 3 records the vehicle environment in a second image.

This vehicle system 1a is also configured to initiate braking with a first braking force when a critical braking situation has been identified in the first image, and to initiate braking with a second braking force 6 when a critical braking situation has been identified in the second image. Emergency braking 4 is triggered by the first braking force 6 and the second braking force 6.

The vehicle system 1a is also configured to initiate braking with a third braking force 7 when a critical braking situation has been identified in both the first image and the second image, in which case this third braking force 7 is stronger than the second braking force 6 and the first braking force 6.

The third braking force 7 is preferably the hazard braking 5 (full braking). This brings the vehicle to a standstill within the shortest possible time (maximum braking reaction).

The vehicle system 1a also has a diagnostic system 9.

FIG. 4 is a table listing possible diagnoses 9a, 9b. The diagnostic system 9 checks whether the first sensor system 2 and second sensor system 3 are functioning correctly.

The diagnostic system 9 can create a diagnosis 9a for the first sensor system 2 and a diagnosis 9b for the second sensor system 3. These diagnoses can indicate an error and/or failure and/or malfunctioning of one of the sensor systems 2, 3, or both sensor systems 2, 3.

The vehicle system is also configured to take a diagnosis 9a, 9b into account when braking in response to the identification of a braking situation by both sensor systems 2, 3.

This allows for errors in the evaluation or false identifications or non-identifications to be taken into account. This increases the operational safety, in particular with autonomous vehicles.

The various diagnoses 9a, 9b shown in the table, and their implications, shall be explained below.

The first two columns contain the two sensor systems 2, 3. A "0" in these columns for the sensor systems 2, 3 indicates that no braking situation has been identified, and a "1" indicates that a braking situation has been identified.

A "1" in column 9a, means that an error, malfunctioning, etc. has been identified in sensor system 2. A "1" in column 9b, means that an error, malfunctioning, etc. has been identified in sensor system 3.

A "0" in columns 9a or 9b means that no error, malfunctioning, etc. has been identified in the sensor systems 2 or 3.

If no braking situation has been identified (0, 0) in either of the sensor systems 2, 3, and no error has been identified (0, 0) in the diagnoses 9a, 9b, a braking force of 0 is applied, i.e. the vehicle continues to operate autonomously.

If no braking situation is identified (0, 0) in either sensor system 2, 3, but an error is identified (9a=0, 9b=1) or (9a=1, 9b=0) in one of the two diagnoses 9a, 9b, or an error is identified (9a=1, 9b=1) in both diagnoses, emergency braking 4 is initiated, i.e. a first or second braking force 6 is applied.

If a braking situation is only identified (1, 0) with the first sensor system 2, but an error is identified (9a=0, 9b=1) in the second diagnosis 9b, hazard braking 5, i.e. with a third braking force 7, is initiated.

If a braking situation is only identified (1, 0) with the first sensor system 2, but an error is identified (9a=1, 9b=0) in the first diagnosis 9a, emergency braking 4, i.e. with a first or second braking force 6, is initiated.

If a braking situation is only identified (1, 0) with the first sensor system 2, but an error is identified (9a=1, 9b=1) in both diagnoses 9a, 9b, hazard braking 5, i.e. with a third braking force 7, is initiated.

If a braking situation is identified (1, 1) with both sensor systems 2, 3, but an error is identified (9a=1, 9b=1) in both diagnoses 9a, 9b, or an error is only identified (9a=1, 9b=0) in the first diagnosis 9a, or an error is only identified (9a=0, 9b=1) in the second diagnosis 9b, or no error is identified (9a=0, 9b=0) in either diagnosis 9a, 9b, hazard braking 5, i.e. with a third braking force 7, is initiated.

This is assuming that the malfunctioning sensor system would have also identified the critical braking situation if it were functioning properly. This increases the safety for the passengers as well as for other road users.

REFERENCE SYMBOLS 1, 1a vehicle system
2 first sensor system
3 second sensor system
4 emergency braking
5 hazard braking
6 first/second braking force
7 third braking force
8 autonomous operating mode
9 diagnostic system
9a diagnosis for the first sensor system
9b diagnosis for the second sensor system

The invention claimed is:

1. A vehicle system for braking a vehicle, comprising:
a first sensor system configured to record a first image of a vehicle's environment;
an evaluation unit configured to evaluate the first image with regard to a critical braking situation;
a second sensor system, which is independent of the first sensor system, configured to record a second image of the vehicle's environment; and
a second evaluation unit,
wherein the first image and second image overlap, and
wherein the first evaluation unit is configured to identify a critical braking situation in the first image and the second evaluation unit is configured to identify a critical braking situation in the second image,
wherein the vehicle system is configured to:
initiate braking with a first braking force in response to a critical braking situation having been identified in the first image;
initiate braking with a second braking force in response to a critical braking situation having been identified in the second image;
initiate braking with a third braking force in response to a critical braking situation having been identified in both the first image and the second image,
wherein the third braking force is stronger than the second braking force and the first braking force.

2. The vehicle system according to claim 1,
wherein the first evaluation unit and second evaluation unit are configured to process the first and second images in parallel, such that the first evaluation unit and second evaluation unit are configured to identify existing braking situations in the first and second images in parallel.

3. The vehicle system according to claim 2, comprising:
a diagnostic system configured to:
check whether the first sensor system and the second sensor system are functioning correctly; and
create a diagnosis on a basis of the verification,
wherein the vehicle system is configured to take the diagnosis into account when braking as a result of identification of a braking situation by the first and second sensor systems, and
wherein the vehicle system is configured to initiate braking with the third braking force in response to an error and/or malfunctioning of the first and second sensor systems has been detected, and a critical braking situation has been verified by at least one of the two sensor systems.

4. The vehicle system according to claim 2, comprising:
a diagnostic system configured to:
check whether the first sensor system and the second sensor system are functioning correctly; and
create a diagnosis on a basis of the verification, wherein the vehicle system is configured to take the diagnosis into account when braking as a result of identification of a braking situation by the first and second sensor systems, and wherein the vehicle system is configured to initiate braking with the first braking force or the second braking force in response to no error and/or malfunctioning of one of the two sensor systems having been detected and no critical braking situation having been verified by the two sensor systems.

5. The vehicle system according to claim 2, comprising:
a diagnostic system configured to:
check whether the first sensor system and the second sensor system are functioning correctly; and
create a diagnosis on a basis of the verification,
wherein the vehicle system is configured to take the diagnosis into account when braking as a result of identification of a braking situation by the first and second sensor systems, and
wherein the vehicle system is configured to initiate braking with the third braking force in response to an error and/or malfunctioning of one of the two sensor systems having been detected and a critical braking situation having been verified by at least a sensor system that is not malfunctioning.

6. The vehicle system according to claim 1, wherein the first braking force is the same as the second braking force.

7. The vehicle system according to claim 1, wherein the first sensor system and the second sensor system make use of different types of sensor technology.

8. The vehicle system according to claim 7, comprising:
a diagnostic system configured to:
check whether the first sensor system and the second sensor system are functioning correctly; and
create a diagnosis on a basis of the verification,
wherein the vehicle system is configured to take the diagnosis into account when braking as a result of identification of a braking situation by the first and second sensor systems, and
wherein the vehicle system is configured to initiate braking with the third braking force in response to an error and/or malfunctioning of the first and second sensor systems has been detected, and a critical braking situation has been verified by at least one of the two sensor systems.

9. The vehicle system according to claim 7, comprising:
a diagnostic system configured to:
check whether the first sensor system and the second sensor system are functioning correctly; and
create a diagnosis on a basis of the verification,
wherein the vehicle system is configured to take the diagnosis into account when braking as a result of identification of a braking situation by the first and second sensor systems, and
wherein the vehicle system is configured to initiate braking with the first braking force or the second braking force in response to no error and/or malfunctioning of one of the two sensor systems having been detected and no critical braking situation having been verified by the two sensor systems.

10. The vehicle system according to claim 7, comprising:
a diagnostic system configured to:
check whether the first sensor system and the second sensor system are functioning correctly; and
create a diagnosis on a basis of the verification,
wherein the vehicle system is configured to take the diagnosis into account when braking as a result of identification of a braking situation by the first and second sensor systems, and
wherein the vehicle system is configured to initiate braking with the third braking force in response to an error and/or malfunctioning of one of the two sensor systems having been detected and a critical braking situation having been verified by at least a sensor system that is not malfunctioning.

11. The vehicle system according to claim 1, wherein the vehicle system executes hazard braking with the third braking force.

12. The vehicle system according to claim 1, wherein the vehicle system is configured to issue an emergency warning when hazard braking has been initiated.

13. The vehicle system according to claim 1, wherein the vehicle system is configured to execute emergency braking with the second braking force or the first braking force.

14. The vehicle system according to claim 1, wherein the first sensor system is a radar sensor system, and the second sensor system is a lidar sensor system.

15. The vehicle system according to claim 1, comprising:
a diagnostic system configured to:
check whether the first sensor system and the second sensor system are functioning correctly; and
create a diagnosis on a basis of the verification,
wherein the vehicle system is configured to take the diagnosis into account when braking as a result of identification of a braking situation by the first and second sensor systems.

16. The vehicle system according to claim 15, wherein the vehicle system is configured to initiate braking with the third braking force in response to an error and/or malfunctioning of the first and second sensor systems has been detected, and a critical braking situation has been verified by at least one of the two sensor systems.

17. The vehicle system according to claim 15, wherein the vehicle system is configured to initiate braking with the first braking force or the second braking force in response to no error and/or malfunctioning of one of the two sensor systems having been detected and no critical braking situation having been verified by the two sensor systems.

18. The vehicle system according to claim 15, wherein the vehicle system is configured to initiate braking with the third braking force in response to an error and/or malfunctioning of one of the two sensor systems having been detected and a critical braking situation having been verified by at least a sensor system that is not malfunctioning.

19. A vehicle comprising the vehicle system according to claim 1.

20. A train a comprising the vehicle system according to claim 1.

* * * * *